United States Patent Office 3,413,277
Patented Nov. 26, 1968

3,413,277
POLYMERIZATION
John C. Crano and Elizabeth K. Fleming, Barberton,
Ohio, assignors to PPG Industries, Inc., a corporation
of Pennsylvania
No Drawing. Filed Aug. 23, 1963, Ser. No. 304,246
19 Claims. (Cl. 260—93.5)

ABSTRACT OF THE DISCLOSURE

Ethylenically unsaturated compounds are polymerized with a catalyst system comprising an organic peroxycarbonate ester and a water-soluble salt of dithionous acid.

This invention relates generally to the polymerization of olefinically unsaturated polymerizable compounds, notably compounds susceptible to free radical polymerization derived from ethylene, which contain the group:

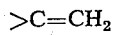

In particular, it relates to new redox-catalyst systems and methods useful for producing low-temperature polymerization of such olefinic compounds. These systems are devised from organic peroxycarbonate polymerization catalysts and specific salts of dithionous acid as redox agents.

Previously it has been known that free radical polymerization may be carried out at reduced temperatures by employing free radical initiators which function at lower temperatures. Further, it has been recognized that certain free radical initiating catalysts, such as various organic peroxides, could be employed in conjunction with specified redox systems to produce polymerization at reduced temperatures. Such a procedure is utilized in the production of "cold" rubber. It has also previously been known and described in U.S. Patent 2,464,062 that organic peroxydicarbonates, such as diisopropyl peroxydicarbonate, would initiate polymerization of unsaturated material such as styrene at 25° C. Benzoyl peroxide and related compounds used without activators generally require temperatures on the order of 50° C. to 80° C.

Polymerization at lower temperatures is desirable for a variety of reasons. For example, at lower temperatures more facile temperature control, faster polymerization because of more rapid heat removal, reduced discoloration, higher molecular weight, etc. may be obtained. Further, in the preparations of copolymers of substances such as butadiene and isoprene which contain a second olefinic bond, polymerization at the usual high temperature leads to cross-linking and branch-chain formation.

Now it has been discovered that polymerization of unsaturated substances, notably ethylenically unsaturated polymerizable monomers, such as ethylene and derivatives of ethylene which are monosubstituted, or unsymmetrically disubstituted, viz, styrene, may be effectively polymerized at temperatures as low as 5° C. or even lower, by conducting the polymerization in the presence of a redox system with a catalyst which is an organic peroxycarbonate, for example, diisopropyl peroxydicarbonate. As a result of this discovery of new redox systems, polymerization yields are easily obtainable which previously could be obtained only at elevated temperatures and with high catalyst concentration.

By utilization of this discovery, uniform polymers may be obtained. Frequently by low-temperature polymerization higher-melting polymers may be obtained from a monomer than is obtainable by higher temperature polymerization and often these higher-melting polymers are more stable and less readily decomposed by thermal means. Further, copolymers and homopolymers involving monomers like butadiene, isoprene, and chloroprene may be obtained by low-temperature polymerization with little or no cross-linking. This makes possible the preparation of fusible polymers containing olefinic unsaturation which may be utilized in subsequent cross-linking. Many other advantages may also be realized by the practice hereof, as will be apparent hereinafter.

In accordance herewith, polymerization of unsaturated polymerizable compounds, notably ethylene, monosubstituted ethylenes and unsymmetrically disubstituted ethylene, is induced by proper use of small quantities of organic peroxycarbonate, notably diisopropyl peroxydicarbonate. Thus, a combination of peroxycarbonate ester, such as O,O-tertiarybutyl O-isopropyl monoperoxycarbonate, or diisopropyl peroxydicarbonate, and a water-soluble salt of dithionous acid, such as sodium dithionite (sodium hydrosulfite), is used in liquid phase polymerization of ethylenically unsaturated monomers, ideally in a heterogeneous aqueous polymerization medium. In such aqueous polymerization medium a solution of peroxycarbonate in liquid monomer is agitated with an aqueous solution to distribute the organic liquid in the aqueous medium containing emulsifying agent and water-soluble salt of dithionous acid, such as sodium dithionite (sodium hydrosulfite), whereby to effect polymerization of the ethylenically unsaturated monomer at reduced temperature in an emulsion or dispersion.

In accordance with the procedure disclosed herein, agitation of aqueous polymerization medium containing emulsifying agent and water-soluble salt of dithionous acid with a liquid monomer containing peroxycarbonate catalyst results in suspension or emulsion polymerization. Usually emulsion polymerization occurs and is preferred, but may occur with some amount of suspension polymerization. Emulsion polymerization is characterized by the formation of droplets or particles of 0.5 micron or less, while suspension polymerization is generally characterized by particles of 5 micron or larger size. Moreover, the continuous phase of the emulsion is generally the aqueous phase although rarely the phases are reversed to result in a continuous oil phase. Often no suspension polymerization will result in a system which readily results in emulsion polymerization.

The unsaturated materials which may be polymerized by the practice of this invention are ethylenically unsaturated compounds, more specifically ethylene and monosubstituted and unsymmetrically disubstituted ethylenes containing up to 20 carbon atoms. These compounds includes esters, nitriles and organic halogen compounds which are olefinically unsaturated compounds of both aromatic and aliphatic types. Heterocyclic compounds, viz, vinylpyrrolidone, which contain ethylenic unsaturation in a side chain are also included. By way of illustration, vinyl esters such as vinyl acetate, vinyl propionate, vinyl butyrate, vinyl isobutyrate, and other vinyl esters containing as many as 18 carbon atoms in the acid moiety, may be polymerized in accordance herewith.

Other vinyl derivatives, such as vinyl chloride, vinyl fluoride, styrene, nuclear substituted styrenes including o-methyl, m-methyl, p-methylstyrene, divinylbenzene, and other related compounds may also be polymerized in accordance herewith. Vinylidene derivatives, e.g., vinylidene chloride, respond to this polymerization also.

The acrylates respond particularly well to the techniques disclosed herein and the invention extends to include acrylates and methacrylates containing up to 16 carbon atoms in the alcohol moiety. By way of illustration, methyl methacrylate, ethyl acrylate, propyl acrylate, butyl acrylate, isobutyl acrylate, decyl acrylate, dodecyl methacrylate, and other related compounds respond to treatment set forth herein.

Other materials susceptible to the practice hereof include: acrylonitrile, methacrylonitrile, certain allyl esters, viz, the bisallyl biscarbonate ester of diethylene glycol, etc., and many related compounds and certain propylene derivatives, such as isopropenyl bromide, chloride, and acetate.

Copolymers of the aforementioned unsaturated materials may be obtained. Among the more important copolymers which may be prepared in accordance herewith are: copolymers of butadiene, acrylonitrile, isoprene, vinyl acetate, vinylidene chloride, methylacrylate, and divinylbenzene with styrene, chloroprene, and one another. Copolymers of butadiene with styrene, butadiene with acrylonitrile, butadiene with chloroprene, isoprene with styrene, vinyl acetate with vinylidene chloride, chloroprene with acrylonitrile, styrene with methyl acrylate, and styrene with divinylbenzene, are examples of specific copolymers which may be prepared pursuant to this invention. Terpolymers prepared in accordance herewith are often of special utility, such as those derived from butadiene, acrylonitrile, styrene mixtures and other mixtures wherein vinyl acetate, isoprene, or methyl methacrylate may be components of the terpolymers.

Useful emulsifying agents may be nonionic, cationic, or anionic, as well as mixtures thereof. Mixtures of emulsifying agents often produce enhanced results. Examples of suitable emulsifying agents which may be employed herein include the following, but it is not intended to exclude many similar emulsifying agents which are not disclosed herein, as well as mixtures of emulsifying agents:

Anionic: sodium lauryl sulfate (Duponol ME), sodium alkylnaphthalenesulfonate (Nekal BX–78), sodium salt of sulfated alkylphenoxypolyoxyethylene (Alipol CO–433), complex organic phosphate (Gafac RE–610).

Nonionic: nonylphenoxypoly (ethyleneoxy) ethanols (Igepal CO–630 and CO–880), polyoxyethylated fatty alcohol (Emulphor ON–870).

Amphoteric: hydroxylated phosphatides of soybean oil complex (Hydroxy Lecithin).

Organic peroxycarbonates which are useful in the practice of this invention contain the group:

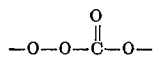

This group is present in both the organic peroxydicarbonates and the organic monoperoxycarbonates. In the organic monoperoxycarbonates, such a group may be attached to alkyl groups or substituted alkyl groups which are the same or different groups on opposite ends of the percarbonate group. In organic peroxydicarbonates, such a group is linked through the peroxy oxygen to a second carbonyl group as in the carbalkoxy group and the carbonate group is linked directly to an alkyl group or substituted alkyl group, which may be identical or different from the alkyl group contained in the carbalkoxy group. Such alkyl groups or substituted alkyl groups attached to the preoxycarbonate group are organic radicals derived from alcohols or substituted alcohols which bear inert substituents, such as halogen, nitro, carbalkoxy, ether, and carbonyl, and which radicals are linked through oxygen atoms to the carbonyl radical of the carbonate group. The symmetrical peroxydicarbonate esters, such as diisopropyl peroxydicarbonate, are especially effective. Also effective are the O,O-alkyl O-alkyl monoperoxycarbonates, like O,O-tertiarybutyl O-isopropyl monoperoxycarbonate. These compounds form free radicals useful for the initiation of emulsion polymerization.

In accordance herewith, peroxycarbonate compounds initiate free radical polymerization at still lower temperatures when employed in the cooperative presence of water-soluble salts of dithionous acid, viz, sodium dithionite. Among the organic peroxycarbonates suitable for use herein are the peroxydicarbonates of monohydric alcohols containing less than about 18 carbon atoms. Other organic peroxycarbonates suitable for use herein are the monoperoxycarbonates derived from an alkyl, or substituted alkyl chloroformate and an alkyl hydroperoxide, or substituted alkyl hydroperoxide containing up to 18 carbon atoms in the alkyl hydroperoxide moiety and up to 18 carbon atoms in the alkyl chloroformate moiety. Especially suitable for use for catalyzing polymerization in conjunction with water-soluble salts of dithionous acid at lower temperatures, are the alkyl peroxydicarbonates derived from alcohols containing up to about 18 carbon atoms, such as methyl, ethyl, isopropyl, n-propyl, isobutyl, n-butyl, lauryl, amyl, hexyl, and octadecyl peroxydicarbonates. Corresponding unsaturated aliphatic peroxydicarbonates may also be employed, such as the allyl, methallyl, crotyl, vinyl, propargyl, or 2-chloroallyl, peroxycarbonates. Aralifatic, heterocyclic, aromatic, and cycloaliphatic derivatives, such as benzyl, cyclohexyl, tetrahydrofurfuryl, cinnamyl peroxydicarbonate, also may be used according to this invention. Moreover, more complex peroxydicarbonates such as bis-(2-nitro-2-methylpropyl) peroxydicarbonates and the products derived by reaction of the chloroformates of monohydroxy acids or their esters (ethyl lactate, ethyl glycollate, ethyl salicylate, methyl lactate, etc.) with sodium peroxide may be used as herein contemplated.

Among the O,O-alkyl O-alkyl monoperoxycarbonates which are herein contemplated are those compounds derived from chloroformates of aliphatic alcohols, or substituted aliphatic alcohols containing up to 18 carbon atoms in the alcohol moiety of the chloroformates and hydroperoxides derived from aliphatic or substituted aliphatic alcohols containing up to 18 carbon atoms in the hydroperoxide moiety of the monoperoxycarbonate. Specific monoperoxycarbonates include: O,O-ethyl O-methyl monoperoxycarbonate, O,O-isopropyl O-isopropyl monoperoxycarbonate, O,O - tertiarybutyl O - isopropyl monoperoxycarbonate, O,O-tertiarybutyl O-benzyl monoperoxycarbonate, O,O-tertiarybutyl O,2-chloroethyl monoperoxycarbonate, O,O-ethyl O-isopropyl monoperoxycarbonate, O,O-isopropyl O-dodecyl monoperoxycarbonate, O,O-n-amyl O-dodecyl monoperoxycarbonate, O,O-tertiaryamyl O-dodecyl monoperoxycarbonate, O,O-tertiarybutyl O-octadecyl monoperoxycarbonate, O,O-tertiaryamyl O-octadecyl monoperoxycarbonate, O,O-tertiarybutyl O-methyl monoperoxycarbonate, O,O-tertiarybutyl O-ethyl monoperoxycarbonate, O,O-tertiarybutyl O-propyl monoperoxycarbonate, O,O-tertiarybutyl O-butyl monoperoxycarbonate, O,O-tertiarybutyl O-isobutyl monoperoxycarbonate, O,O-tertiaryamyl O-isopropyl monoperoxycarbonate, O,O-tertiaryamyl O-tertiarybutyl monoperoxycarbonate, and O,O-(1-methylcyclohexyl) O-isopropyl monoperoxycarbonate. Also contemplated are the polymeric peroxydicarbonates obtained by reacting ethylene glycol dichloroformate, or diethylene glycol dichloroformate, or dichloroformate of other glycol or polyglycol with sodium peroxide and such other peroxydicarbonates as may be described or suggested in U.S. Patent 2,370,588.

The peroxydicarbonate esters are usually water-insoluble liquids, but sometimes are white crystalline solids at room temperature. They are usually soluble in the polymerizable monomers at or below the temperature of polymerization. The percarbonate esters, and particularly the liquid esters, slowly decompose at normal room temperatures and may at slightly higher temperatures decompose spontaneously. Since the decomposition reaction is exothermic, the heat generated by slow decomposition at normal room temperature may cause an elevation of the temperature within the mass and induce rapid decomposition. Accordingly, the percarbonates should be refrigerated or otherwise stabilized prior to use. The stabilization may be effected by cooling to 0° C. or lower by suitable cooling medium, for example, solid carbon dioxide. The stabilization may be effected also by dissolving up to one percent of iodine in the liquid percarbonate and washing the iodine out just prior to the use.

The redox agents employed herein are water-soluble salts of dithionous acid. These salts are obtained by double decomposition reactions with the sodium salt of dithionous acid. Sodium dithionite ($Na_2S_2O_4$) is an article of commerce known alternatively as sodium hydrosulfite. Specific salts of dithionous acid which may be employed in accordance herewith are: sodium dithionite, potassium dithionite, lithium dithionite, ammonium dithionite, tetramethylammonium dithionite, magnesium dithionite, calcum dithionite, strontium dithionite, barium dithionite, zinc dithionite, cadmium dithionite, iron (II) dithionite, cobalt (II) dithionite, nickel (II) dithionite, and manganese dithionite. Where certain dithionite salts induce other considerations, such as discoloration of products of polymerization, it is important to utilize only those which do not discolor the product. Therefore, the alkali and alkaline earth metal salts and especially the sodium and potassium salts are preferred. In the practice of this invention the soluble salt of dithionous acid, which is selected for utilization, is dissolved in water to obtain an aqueous solution having the dithionite present in a preferred concentration. Since all dithionite salts are somewhat unstable in aqueous solution, it is preferred that these solutions be prepared immediately before use and only in such quantities as immediately required. To such aqueous solutions emulsifying agents, such as nonylphenoxypoly(ethyleneoxy)ethanol (Igepal CO-630), or sodium lauryl sulfate (Duponol ME), are added. The aqueous solution is then cooled to 5° C., or other suitable low temperature, prior to combination with ethylenically unsaturated material, such as described hereinbefore and typified by styrene, to which monomer has previously been added a small quantity, for example 0.5 part by weight of dialkyl peroxycarbonate, typically diisopropyl peroxydicarbonate per 100 parts of monomer. After agitation at 5° C. for a period of time, suitably for 4 hours, the polymerized emulsion resulting may be separated to recover polymer and unconverted monomer. The separation of polymerized emulsion may be accomplished by dilution with a solvent to cause stratification into organic phase and aqueous phase. Heptane may be employed for this purpose.

The temperature used in the practice hereof may be any temperature from −35° C. to 100° C., although the vapor pressure of certain monomers would require that the reaction be carried out under pressure sufficient to maintain the monomer as a liquid at the chosen temperature. Moreover, temperatures below approximately 0° C. require special apparatus for cooling and precaution against ice formation on the cooling coils must be taken. Hence, a nonparticipating water-soluble organic solvent, such as acetone or methanol, is required to be added when it is desired to conduct polymerization at temperatures below 0° C. At temperatures approaching the normal boiling point of the liquid medium, the reaction may become uncontrollably rapid when, by way of illustration, the emulsion polymerization herein disclosed, is applied to styrene. The medium has a boiling point near 100° C. and utilization of such a high temperature with the herein disclosed redox-catalyst system would result in a polymerization rate of very violent intensity. However, when it is desired to employ high temperatures in the utilization of those redox-catalyst systems, the polymerization may be conducted at a controllable rate by reducing the concentration of the redox agent. Temperatures such as those above 35° C. in general have a tendency to produce polymers lacking the improved properties obtained by polymerization at lower temperatures, such as 5° C. Thus, while it is feasible to employ the redox catalyst system disclosed herein at temperatures from −35° C. to 95° C., benefits are greatest with temperatures from approximately −20° C. to approximately 30° C.

The concentration of the various components utilized in the practice hereof may be varied over extremely wide ranges. The amount of aqueous phase employed may vary from a few percent by weight of the monomer phase to many times the weight of the monomer phase. However, the relationship of aqueous phase to organic phase is dependent upon the type of emulsion desired and the particular monomer which is being polymerized. Generally, from 50 parts to 1,000 parts of water per 100 parts by weight of monomer is preferred. When it is desired to polymerize styrene, employing the technique herein described, a suitable ratio is 220 parts of water per 100 parts of monomer by weight. Increasing the quantity of water greatly requires an increase in the quantity of redox agent employed, whereas a decrease in the quantity of water often results in too rapid polymerization.

In preparation for polymerization, the selected peroxycarbonate is dissolved in the monomer by stirring. The amount of peroxycarbonate employed depends on the particular peroxycarbonate selected. Generally, adequate initiation of polymerization may be obtained by dissolving 0.001 mole of peroxycarbonate in the monomer per mole of monomer. For a monomer of molecular weight of about 100 and diisopropyl peroxydicarbonate this represents 0.2 weight percent of the monomer. When the particular peroxycarbonate is diisopropyl peroxydicarbonate, a suitable polymerization is initiated by employing as little as 0.02 percent or even less of diisopropyl peroxydicarbonate by weight of monomer. Utilization of more than 2.0 percent of diisopropyl peroxydicarbonate by weight of styrene results in an uncontrollably rapid polymerization at 5° C. Thus, it is preferred to employ from 0.02 to 2.0 percent diisopropyl peroxydicarbonate by weight of monomer. Many monomers are polymerized at preferred rates by the utilization of 0.5 percent diisopropyl peroxycarbonate by weight of monomer. Other peroxycarbonates, such as O,O-tertiarybutyl O-isopropyl monoperoxycarbonate, usually require that a different quantity be employed in accordance with the oxygen equivalent of the particular peroxycarbonate.

The weight ratio of redox agent to peroxydicarbonate depends upon the particular redox agent and particular peroxydicarbonate selected, as well as upon the monomer and amount of aqueous phase. Thus, when polymerizing styrene with diisopropyl peroxydicarbonate, a preferred amount of sodium dithionite is approximately 0.06 gram in 220 gram of water per 100 grams of styrene monomer containing 0.47 gram of diisopropyl peroxydicarbonate. Thus, approximately 0.13 part by weight of redox compound is preferred per part of peroxycarbonate. In general, more than 0.1 part by weight of redox compound per part of peroxycarbonate, but less than 3.0 parts by weight of redox compound per part of peroxycarbonate is required. Ratios of redox compound to peroxycarbonate outside of this range generally give rates of reaction which are too slow at the high ratio. Preferred ratios are generally within the range of 0.15 part by weight of redox compound per part of peroxycarbonate.

The amount of redox agent required is approximately proportional to the amount of unsaturated monomer employed and may also vary within wide limits. When 220 parts of water per 100 parts of monomer are employed, the amount of redox agent may be selected from 0.05 part to as much as 5.0 parts of redox agent per 100 parts of monomer by weight. In the polymerization of styrene good results may be obtained by employing from 0.06 to 1.0 part of redox agent per 100 parts of monomer by weight.

The amount of emulsifier is selected in accordance with the condition of the emulsion obtained under reaction conditions. It is generally desirable to produce the emulsion of the monomer in the aqueous phase so that the solid polymer at completion of the conversion has the consistency of sand, or in other cases so that a cream reuslts. Since creams generally require greater quantities of emulsifying agent than do emulsifications containing larger droplets, it is necessary to select the amount of emulsifying agent in accordance with the result sought. However, when 220 parts of water are employed per 100 parts by weight of monomer, a satisfactory amount of emulsifier is from 2 to 20 parts of emulsifier per 100 parts of monomer by weight. The nature of the emulsifying agent, i.e., whether ionic or nonionic appears to have little effect on the quantity of emulsifier utilized. Further, either anionic or cationic emulsifying agents may be employed. However, the rate of polymerization and yield of polymer is dependent to some degree upon the type and amount of emulsifying agent employed.

As in other polymerizations, the presence of oxidizing atmosphere has an adverse influence on the yield of polymer and the properties of the polymer, such as molecular weight. Thus, it is preferred to carry out the polymerization in accordance herewith by also excluding air from the reaction system. This may be accomplished most readily by displacing air from the apparatus used in carrying out the polymerization by an atmosphere of nitrogen.

Substances foreign to the polymerization are generally not desirable in either the organic medium or the aqueous medium. However, many substances may be present without harmful effect, viz., certain salts may be added to alter the density of the aqueous layer to facilitate subsequent separation of layers providing they are otherwise inert. Sodium hydroxide or other alkaline material is sometimes desirable to prevent hydrolysis of the emulsifying agent. Also inert solvent may be incorporated in either layer. Thus, for certain purposes substances may be added which do not contribute to the polymerization per se provided that these be inert.

The invention described herein may be better understood by reference to the following examples. It is not intended, however, that the invention be construed as limited thereby.

EXAMPLE I

A standard polymerization bottle was equipped with means for introducing solutions and an inert gas to provide an atmosphere free from oxygen and to permit introduction of the various components. Samples could also be withdrawn at intervals as required.

An aqueous solution of 220 grams of water and 0.06 gram of dissolved sodium dithionite (hydrosulfite) was introduced into the pressure apparatus. Sodium lauryl sulfate (Duponol ME), 5 grams, was also dissolved in the aqueous solution. The unsaturated material, 100 grams of styrene containing 0.47 gram of dissolved diisopropyl peroxydicarbonate, was cooled to 0° C. separately, while the apparatus was flushed with nitrogen to remove air. After flushing the bottle the contents were cooled to 5° C. and the cooled unsaturated material containing peroxydicarbonate was introduced. Agitation was provided by tumbling the pressure bottle in a thermostat at 5° C. After 3 hours, conversion reached 48 percent by weight and the terminal conversion was 80 percent by weight of the monomer charged.

An identical conversion is obtained by substituting 0.07 gram of potassium dithionite for its equivalent 0.06 gram of sodium dithionite.

Peroxydicarbonates which may be substituted in equimolar amounts for diisopropyl peroxydicarbonate by providing prolonged reaction time or higher reaction temperature:

Diisobutyl peroxydicarbonate
Di-n-butyl peroxydicarbonate
Di-n-propyl peroxydicarbonate
Di(2-nitro-2-methylpropyl) peroxydicarbonate
Dibenzyl peroxydicarbonate
Di(2-chloroethyl) peroxydicarbonate Peroxydicarbonates which require extended reaction time at 5–10° C.:

| Peroxycarbonate | Time to about 80% conversion, hrs. | Amount of (g.) sodium dithionite |
|---|---|---|
| O,O-tertiarybutyl O-isopropyl monoperoxycarbonate | 10–12 | 0.6–1.0 |
| O,O-tertiaryamyl-O-isopropyl monoperoxycarbonate | 11–14 | 0.6–1.0 |

In lieu of sodium dithionite in Example I, other redox agents as follows may be employed in equivalent amounts at 5 to 10° C. to result in polymers: sodium dithionite, potassium dithionite, lithium dithionite, calcium dithionite, magnesium dithionite, barium dithionite, and zinc dithionite.

Other unsaturated materials which may be polymerized by the procedure of Example I are: vinyl chloride, vinylidene chloride, divinyl benzene, butadiene, acrylonitrile, methacrylonitrile, methyl acrylate, ethyl acrylate, and bis-allyl carbonate of diethylene glycol.

EXAMPLE II

In the procedure of Example I, 0.39 gram of diisopropyl peroxydicarbonate, and 0.22 gram of sodium dithionite were substituted for 0.47 gram and 0.06 gram of peroxycarbonate and dithionite, respectively. A mixture of 42 grams of styrene and 58 grams of vinylidene dichloride was substituted for 100 grams of styrene used in Example I. Slightly less, 186 grams of water was employed. After 6 hours, 55 percent by weight of the monomer mixture was converted.

Other unsaturated materials which may be used in a mixture of comonomers for polymerization by the procedure of Example I are:

| | Percent by wt. |
|---|---|
| Styrene | 50 |
| Acrylonitrile | 50 |
| Acrylonitrile | 30 |
| Butadiene | 30 |
| Styrene | 40 |
| Styrene | 50 |
| Methyl methacrylate | 50 |
| Vinyl acetate | 70 |
| Vinylidene chloride | 30 |

There have been set forth hereinbefore the various groups of redox compounds which are useful in practicing the invention. Many compounds having the proper elements of structure may be selected without departing from the spirit of the invention. It is not intended that the invention be limited to the previously disclosed types of compounds since one skilled in the art can readily conceive of variations which contain water-soluble salts of dithionous acid that are not specifically described hereinbefore.

While the invention has been described with reference to the details of certain specific embodiments, it is not intended that the invention be limited thereto except insofar as may appear in the following claims.

What we claim is:

1. A method of polymerizing ethylenically unsaturated compounds susceptible to free-radical polymerization, which comprises polymerizing such unsaturated compounds at temperatures of from −35° C. to 100° C. with a redox catalyst comprising a catalytic amount of an organic peroxycarbonate ester and a reducing amount of a water-soluble salt of dithionous acid.

2. A method according to claim 1 wherein from 0.02 to 2.0 weight percent organic peroxycarbonate ester, based on unsaturated compound, and from 0.1 to 3.0 parts by weight of water-soluble dithionous acid salt per part of organic peroxycarbonate ester are used.

3. A method according to claim 1 wherein said water-soluble salt of dithionous acid is an alkali or alkaline earth metal salt.

4. A method according to claim 1 wherein said water-soluble salt of dithionous acid is selected from the group consisting of sodium dithionite, potassium dithionite, and ammonium dithionite.

5. A method according to claim 1 wherein said peroxycarbonate ester is selected from the group consisting of O,O-tertiarybutyl O-isopropyl monoperoxycarbonate, O,O-tertiaryamyl O-isopropyl monoperoxycarbonate, diisopropylperoxydicarbonate and dicyclohexylperoxydicarbonate.

6. A method according to claim 1 wherein said organic peroxycarbonate ester is selected from the group consisting of alkyl peroxydicarbonates and O,O-alkyl O-alkyl monoperoxycarbonates wherein the alkyl moieties contain up to 18 carbon atoms.

7. A method according to claim 1 wherein a mixture of ethylenically unsaturated monomers is polymerized.

8. A method according to claim 1 wherein said polymerization temperatures range from $-20°$ C. to $30°$ C.

9. In a process of polymerizing ethylenically unsaturated compounds susceptible to free-radical polymerization at temperatures of from $-35°$ C. to $100°$ C., with catalytic amounts of an organic peroxycarbonate ester, the improvement which comprises employing a reducing amount of a water-soluble salt of dithionous acid with respect to said organic peroxycarbonate ester.

10. A process according to claim 9 wherein said water-soluble salt of dithionous acid is an alkali metal or alkaline earth metal salt.

11. A process according to claim 9 wherein said organic peroxycarbonate ester is an organic peroxydicarbonate ester or organic monoperoxycarbonate ester and wherein the organic moiety of such peroxycarbonate esters contain up to 18 carbon atoms.

12. A process according to claim 9 wherein from 0.1 to 3.0 parts by weight of water-soluble dithionous acid salt per part of peroxycarbonate ester is used.

13. A method of polymerizing styrene which comprises agitating at temperatures of from $-35°$ C. to $100°$ C. an aqueous polymerization medium comprising an aqueous solution of emulsifying agent and a reducing amount of alkali metal salt of dithionous acid with a mixture of styrene containing a catalytic amount of an organic peroxycarbonate ester selected from the group consisting of O,O-tertiarybutyl O-isopropyl monoperoxycarbonate, O,O-tertiaryamyl O-isopropyl monoperoxycarbonate, diisopropyl peroxydicarbonate, and dicyclohexyl peroxydicarbonate.

14. A method of polymerizing ethylenically unsaturated compounds containing the $>C=CH_2$ group, which comprises polymerizing such unsaturated compounds at temperatures of from $-35°$ C. to $100°$ C. with a redox catalyst comprising a catalytic amount of an organic peroxycarbonate ester containing the $$-O-O-\overset{\overset{\displaystyle O}{\|}}{C}-O-$$

group and a reducing amount of a water soluble salt of dithionous acid.

15. A method which comprises admixing a catalytic amount of an organic peroxycarbonate ester with an ethylenically unsaturated monomer susceptible to free-radical polymerization, and contacting at temperatures of from $-35°$ C. to $100°$ C. said peroxycarbonate-unsaturated monomer mixture with an aqueous medium comprising an aqueous solution of an emulsifying agent and a reducing amount of a water-soluble salt of dithionous acid with respect to said organic peroxycarbonate ester.

16. A method of polymerizing ethylenically unsaturated monomers containing the $>C=CH_2$ group, which comprises agitating at temperatures of from $-35°$ to $100°$ C. an aqueous polymerization medium comprising an aqueous solution of an emulsifying agent, an ethylenically unsaturated monomer, a catalytic amount of an organic peroxycarbonate ester and a reducing amount of a water-soluble salt of dithionous acid with respect to said organic peroxycarbonate ester.

17. A redox catalyst composition consisting essentially of a catalytic amount of an organic peroxycarbonate ester and a reducing amount of a water-soluble salt of dithionous acid with respect to said organic peroxycarbonate ester.

18. A redox catalyst composition consisting essentially of catalytic amounts of a member selected from the group consisting of organic peroxydicarbonates and organic monoperoxycarbonates and from 0.1 to 3.0 parts by weight, per part of organic peroxycarbonate, of a member selected from the group consisting of alkali and alkaline earth metal salts of dithionous acid.

19. A redox catalyst composition consisting essentially of a catalytic amount of diisopropyl peroxydicarbonate and a reducing amount of sodium dithionite with respect to said peroxydicarbonate.

References Cited

UNITED STATES PATENTS

| | | | |
|---|---|---|---|
| 2,716,641 | 8/1955 | Van der Plas et al. | 260—83.7 |
| 3,150,169 | 9/1964 | Johnson et al. | 252—428 |

OTHER REFERENCES

Strain et al., J. Am. Chem. Soc., 1254–1263 (1950).

JOSEPH L. SCHOFER, *Primary Examiner.*

J. C. HAIGHT, *Assistant Examiner.*